(12) United States Patent
Federowicz

(10) Patent No.: US 9,912,136 B1
(45) Date of Patent: Mar. 6, 2018

(54) GUIDE WIRE ASSEMBLY

(71) Applicant: Michael Federowicz, East Providence, RI (US)

(72) Inventor: Michael Federowicz, East Providence, RI (US)

(73) Assignee: RIOK Enterprises LLC, Smithfield, RI (US)

( * ) Notice: Subject to any disclaimer, the term of this patent is extended or adjusted under 35 U.S.C. 154(b) by 0 days.

(21) Appl. No.: 15/190,699

(22) Filed: Jun. 23, 2016

(51) Int. Cl.
*H02G 7/06* (2006.01)

(52) U.S. Cl.
CPC ..................... *H02G 7/06* (2013.01)

(58) Field of Classification Search
CPC .............. H02G 7/06; H02G 7/02; B60M 1/26
USPC .................................................. 267/70, 168
See application file for complete search history.

(56) References Cited

U.S. PATENT DOCUMENTS

| 3,242,541 | A | * | 3/1966 | Freeman | ................. | B60R 22/18 |
| | | | | | | 24/115 R |
| 4,078,277 | A | * | 3/1978 | McCracken | .......... | F16G 11/106 |
| | | | | | | 174/45 R |
| 6,773,002 | B2 | * | 8/2004 | Adoline | ................... | F16F 3/04 |
| | | | | | | 267/168 |

* cited by examiner

*Primary Examiner* — Dhirubhai R Patel
(74) *Attorney, Agent, or Firm* — Salter & Michaelson

(57) ABSTRACT

A guide wire assembly for the support of electrical cabling that extends from an electrical source point, such as an electrical pole, to a use location. The guide wire assembly includes a housing having a base end, an extended end and a longitudinal passage extending between the base end and extended end; an insert constructed and arranged for positioning within the longitudinal passage and having a center bore; a threaded rod having proximal and distal rod ends, the distal end of the threaded rod mating with the center bore of the insert; a coil spring disposed within the longitudinal passage of the housing and about the insert; a first attachment mechanism supported at the proximal end of the threaded rod and for support of a guide wire; and a second attachment mechanism supported at the base end of the housing.

19 Claims, 12 Drawing Sheets

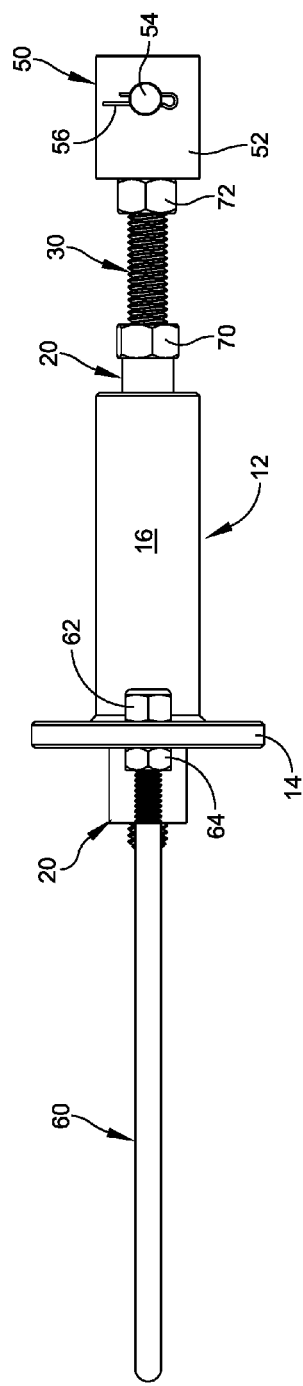
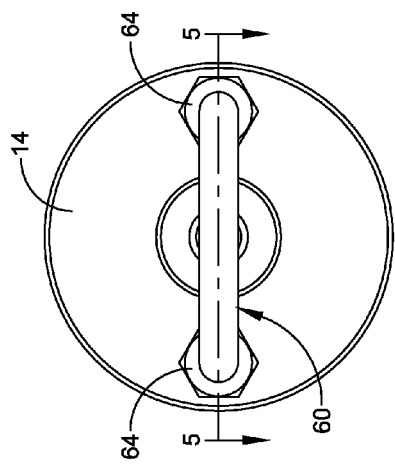

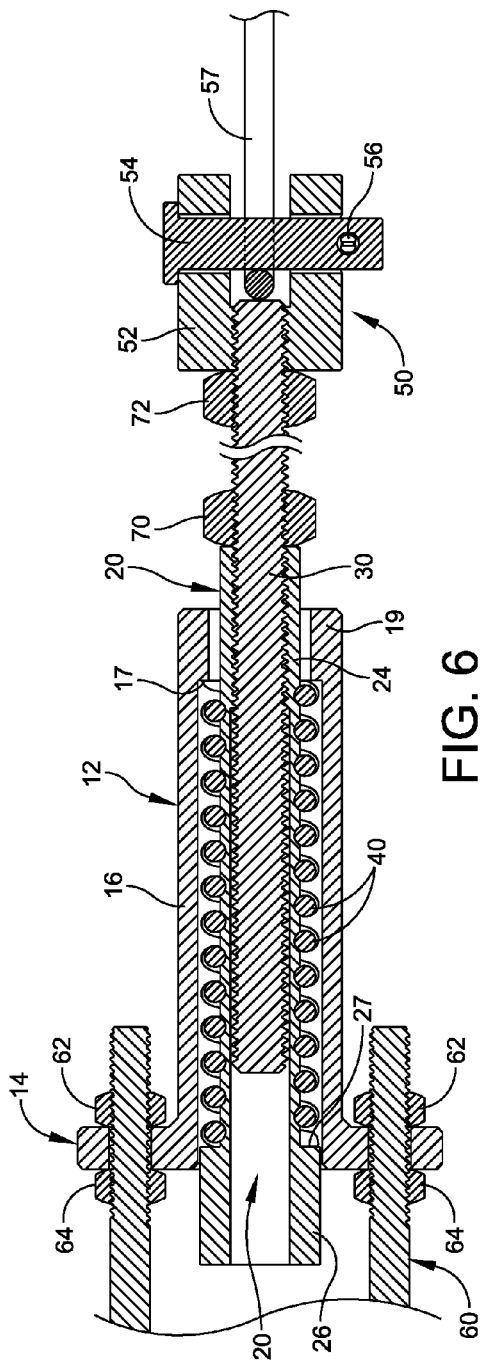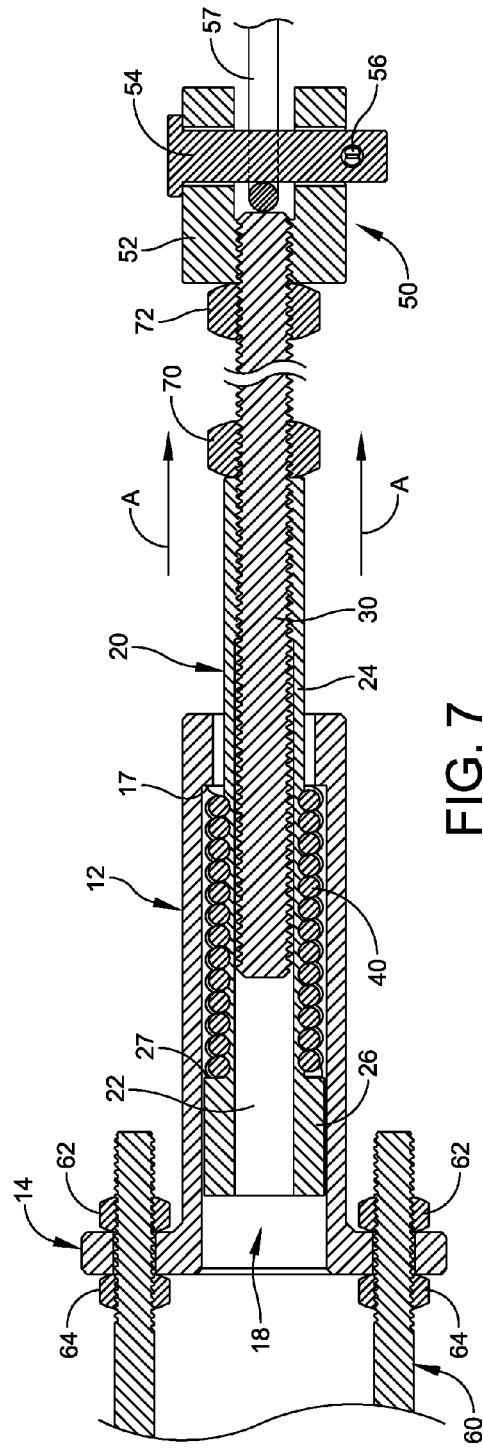

GUIDE WIRE ASSEMBLY

FIELD OF THE INVENTION

The present invention relates in general to a guide wire assembly. More particularly, the present invention relates to a guide wire assembly that is for support of electrical cabling that extends from an electrical source point to a use location. Even more particularly, the present invention relates to an improved guide wire assembly that is simple in construction, can be manufactured inexpensively and that is readily adjustable.

BACKGROUND OF THE INVENTION

At the request of federal and local governments, electrical utility companies have been looking for a solution to help minimize damages to lines caused by harsh environmental conditions, typically related to all kinds of storms. In addition, there is also significant interest in building some resiliency into the electrical grid. High winds, especially when combined with precipitation from seasonal storms, can cause damage to electrical utility systems resulting in service interruptions to large numbers of customers. While most power outages are caused by damage from falling trees limbs, others are caused by high winds and snow/ice buildup. Depending on the severity of the storm and resulting impairment, power outages can last from a few hours or extend to periods of several days, having real economic effects. Power outages impact residential customers, businesses (primarily through lost orders, damage to perishable goods and inventories), and manufacturers (mainly through downtime and lost production, or equipment damage).

Statistics show that repair costs are at an all time high and there seems no end in sight. Over the last ten years there has been a surge in storms and billions of dollars have been spent in federal aid to help restore the electrical grid. Electrical utility companies are quickly becoming risks to their customers due to monthly cost increases and their inability to quickly restore power, sometimes even resulting in loss of life.

All residential and commercial structures require an electrical overhead service conductor or cable to be brought from a utility pole or other main source of electricity to a point of attachment on or near the structure (residential or commercial) to generate power. At the present time when installations are made, a service drop is brought from the main source of electricity such as a utility pole to the building structure and mechanically attached to the service point located somewhere on the building structure. This approach is unsafe because there is no device installed at the time of installation to address service conductor wire or cable issues that can correct or account for issues with utility pole lean which causes overhead wire sag. This situation can become dangerous should the main service conductor pull away from the service point or detaches causing a live wire to fall to the ground and potentially cause injury. Sag in the wire also presents its dangers for a service conductor or cable hanging to low could potentially be snagged by passing vehicles also causing the service conductor to pull or detach from the structure causing a live wire to be on the ground.

Accordingly, it is an object of the present invention to provide an effective wire or cable adjustment assembly and one which in particular addresses the lateral movements in the service conductor or cable which enables slop in the line to be pulled in or let slack out.

Another object of the present invention is to provide an improved method of allowing flexibility in any line to avoid structural damage by means of the service point pulling out from a building structure.

A further object of the present invention is to provide an improved guide wire assembly that is readily adjustable so as to accommodate various field conditions.

Another object of the present invention is to provide a simple mechanism for bringing service conductors or cables to a point of attachment.

Still another object of the present invention is to provide a guide wire adjustment assembly as stated and that can be constructed simply, is inexpensive to manufacture and install, and is safe in operation.

SUMMARY OF THE INVENTION

In accordance with the present invention there is provided a guide wire adjustment assembly for providing the ability of applying lateral movements in the service and cable lines to address the tort and sagging conditions whether they are overhead or hanging in some other fashion. The guide wire adjustment assembly comprises an elongated electrically conductive device that has two points of attachments integrated with a built-in safety turnbuckle mechanism to stop over-travel including a spring loaded device to provide flexibility in the service and cable lines.

The adjustable guide wire assembly of the present invention is preferably corrosion resistant thus providing a cost saving to avoid expensive line or cable repairs. The assembly of the present invention can be installed by linesman and licensed electricians when bringing the service or cable line to a residence or business. It is easily secured to the point of attachment allowing licensed personnel to make adjustments when necessary.

In accordance with the concepts of the present invention there is provided a guide wire assembly for the support of electrical cabling that extends from an electrical source point, such as an electrical pole, to a use location. The guide wire assembly comprises a housing having a base end, an extended end and a longitudinal passage extending between the base end and extended end; an insert constructed and arranged for positioning within the longitudinal passage and having a center bore; a threaded rod having proximal and distal rod ends, the distal end of the threaded rod mating with the center bore of the insert; a coil spring disposed within the longitudinal passage of the housing and about the insert; a first attachment mechanism supported at the proximal end of the threaded rod and for support of a guide wire; and a second attachment mechanism supported at the base end of the housing.

In accordance with other aspects of the present invention the extended end of the housing has the longitudinal passage formed with a step for receiving one end of the coil spring; the insert has a distal head that forms a step for receiving an opposite end of the coil spring; the center bore of the insert is threaded only at a proximal end thereof; including a securing nut threaded with the threaded rod and useable to selectively adjust the tension on the coil spring; including a securing nut threaded with the threaded rod and useable to selectively adjust the tension on the coil spring; the first attachment mechanism comprises a clevis body and associated clevis pin for retaining an end of the guide wire; the second attachment mechanism comprises a U-bolt; and wherein the U-bolt has opposed ends that are attached at opposed sides of the base end of the housing.

Also, in accordance with the present invention there is provided, in combination, a guide wire assembly for support of electrical cabling that extends from an electrical source point to a use location, a guide wire having an end attachment piece and a clamp member supported at the use location. The guide wire assembly comprises a housing having a base end, an extended end and a longitudinal passage extending between the base end and extended end, an insert constructed and arranged for positioning within the longitudinal passage and having a center bore, a threaded rod having proximal and distal rod ends, the distal end of the threaded rod mating with the center bore of the insert, a coil spring disposed within the longitudinal passage of the housing and about the insert, a first attachment mechanism supported at the proximal end of the threaded rod and for support from the attachment piece of the guide wire, and a second attachment mechanism supported at the base end of the housing and for support from the clamp member.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 3 is a side elevation view of the guide wire assembly of FIG. 1;

FIG. 4 is an end view of the guide wire assembly of FIG. 1;

FIG. 6 is an enlarged partial cross-sectional view of the guide wire assembly in its rest position;

FIG. 7 is an enlarged partial cross-sectional view of the wire guide assembly in its stressed condition;

DETAILED DESCRIPTION

Figure 1:
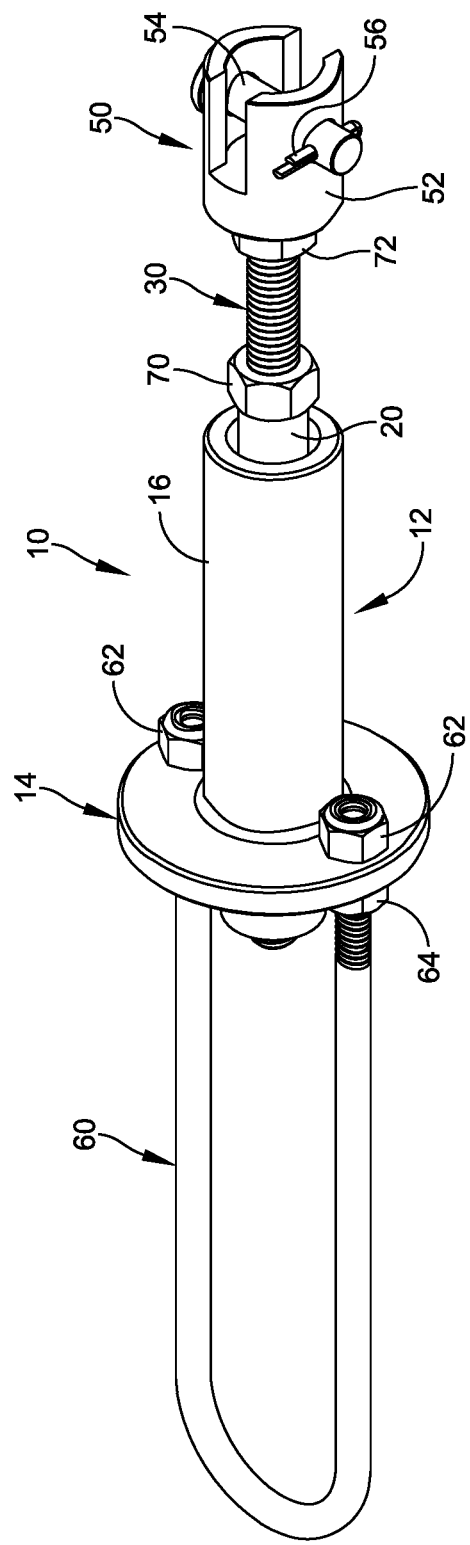
FIG. 1 is a perspective view of one embodiment of the guide wire assembly of the present invention.
Figure 2:
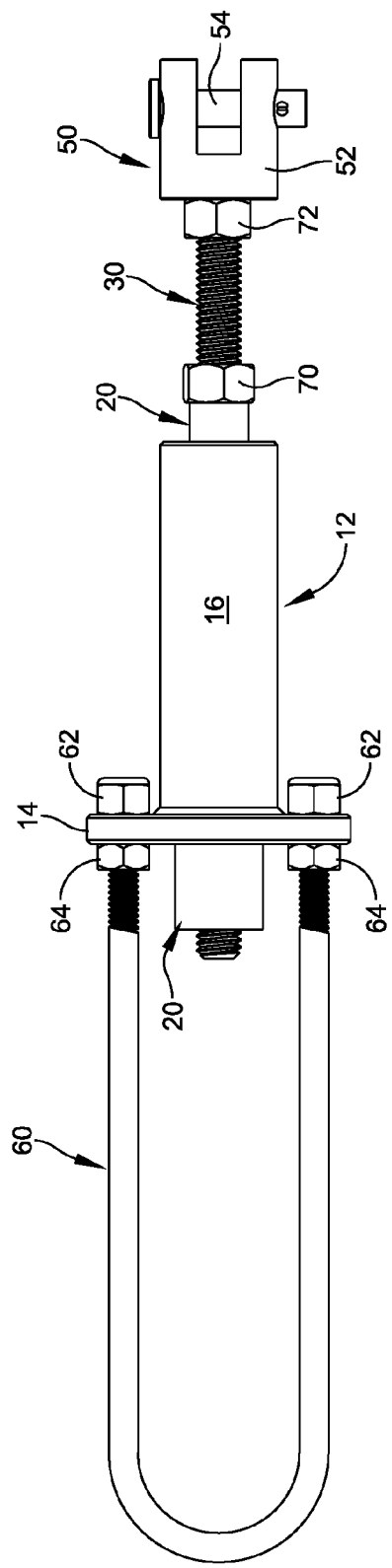
FIG. 2 is a top view of the guide wire assembly of FIG. 1.

Reference is now made FIGS. 1-14 for an illustration of embodiments of the present invention. Before discussing the details of the present invention, we can give consideration to having implemented a solution to the aforementioned drawbacks in order to provide for flexibility in the power distribution lines to help cope with the many elements that can occur particularly during storm seasons. The assembly of the present invention has been constructed to work with the electrical overhead service conductor or cable that is brought from a utility pole or other main source of electricity, to a point of attachment on or near the structure (building) to bring electrical power.

At the present time when installations are made, a service drop is brought from the main source of electricity such as a utility pole, to the structure and attached to the service point. Sometimes lines are installed with a wedge clamp because lines may have been cut too short, and thus acts as a gap filler. The assembly of the present invention was developed to replace the wedge clamp and is readily installed but has much more functionability built into it. The assembly of the present invention provides licensed personnel the opportunity to make corrections in line by making mechanical adjustments directly at the use location.

In addition, the product of the present invention may also operate in conjunction with a wedge clamp. Also, the assembly of the present invention may easily be put in place of conventional overhead distribution line hardware such as an anchor mechanism for electrical and communication lines.

The assembly of the present invention is preferably corrosion resistant, and thus allows for maximum pull loads in excess of 1000 lbs which exceeds the current standard requirements and is designed to provide take up for sagging wires, add bounce for deflecting of debris, and letting out of slack for taut wires possibly caused by leaning poles.

In accordance with the present invention there is a guide wire adjustment assembly for providing the ability of applying lateral movements in the service and cable lines to address the tort and sagging conditions whether they are overhead or hanging in some other fashion. The guide wire adjustment assembly is comprised of an elongated electrically conductive device that has two points of attachments integrated with a built in safety turnbuckle mechanism to stop over-travel accompanied by a spring loaded device to provide flexibility in the service and cable lines.

The preferred corrosion resistant system of the present invention is a cost saving measure to avoid expensive line or cable repairs. This device can be installed by linesman and licensed electricians when bringing the service or cable line to a residence or business. It is easily secured to the point of attachment allowing licensed personnel to make adjustments when necessary.

Reference is now made to FIGS. 1-8 for an illustration of a preferred embodiment of the guide wire assembly 10. Reference may now also be made to FIGS. 9-12 for further illustrations of the use and placement of the guide wire assembly. The guide wire assembly 10 is for support of electrical cabling such as shown in FIG. 9 by cables 90, 93 and 95. The cable 90 is the main source of electricity taken from an electrical source point which is illustrated in, for example, FIGS. 10 and 11 by the utility pole 88. Because the connections at the utility pole are conventional, they are not discussed in detail herein. The cabling extends from the electrical source point or utility pole 88 to a use location which is identified in the drawings, such as in FIGS. 9 and 10 by a building structure shown at 89.

With further respect to FIGS. 9-12, it is noted that the guide wire 58 is also anticipated as extending to the utility pole at one end and is provided with a closed loop 57 at the other end. Thus, one of the attachment locations of the guide wire assembly 10 is at the clevis 50 where, in FIG. 9, the loop 57 is shown engaged. With respect to the guide wire assembly 10, the opposite attachment location is at the clamp member 80. The clamp member 80 includes a securing plate 82 with fasteners 84 for securing the clamp member to the building structure 89. The clamp member 80 also includes a support flange 86. With respect to the guide wire assembly 10, the U-bolt 60 is meant for engagement with the support flange 86.

Figure 9:
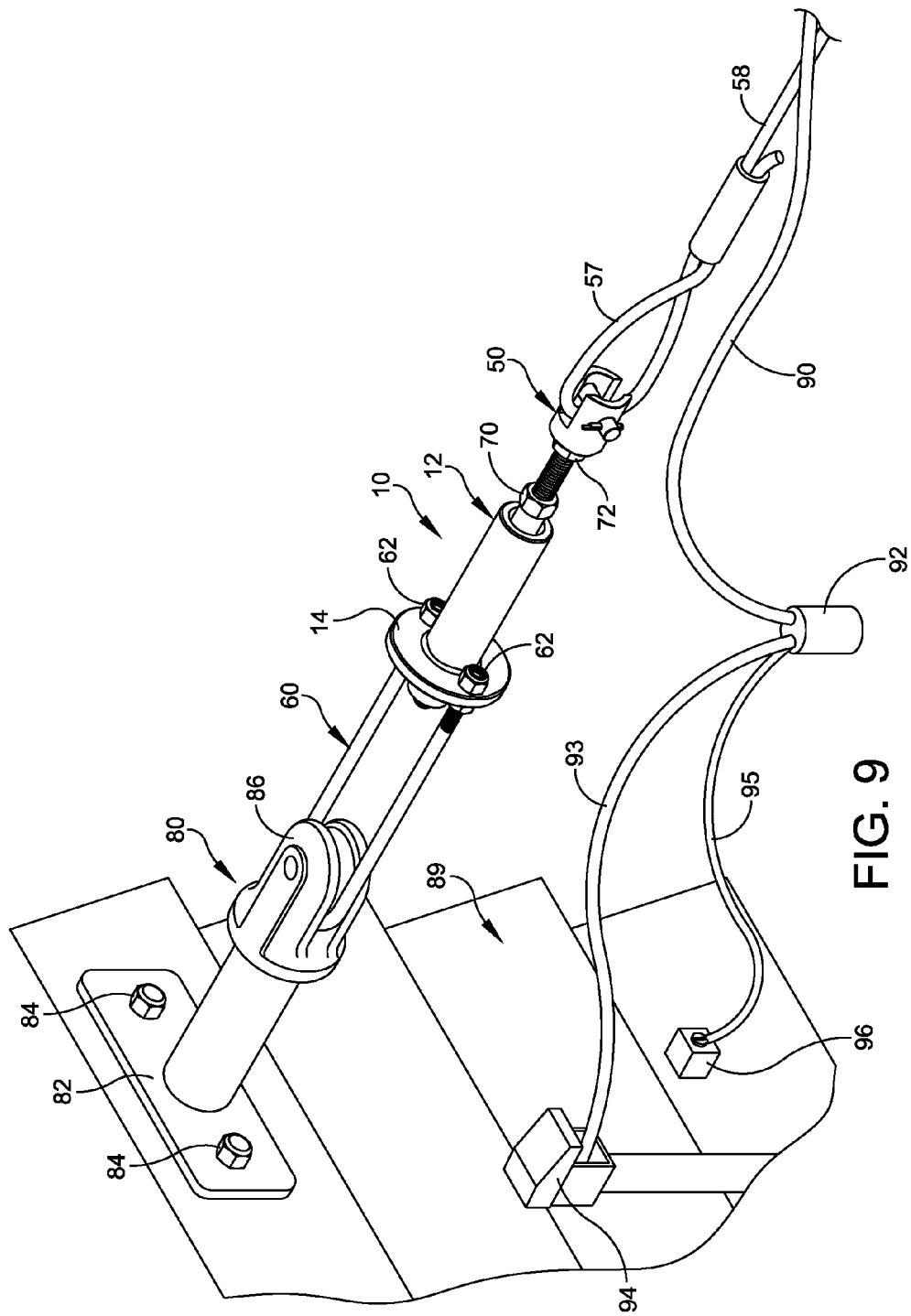
FIG. 9 is a perspective view illustrating the guide wire assembly as associated with a guide wire and electrical cabling.
Figure 10:
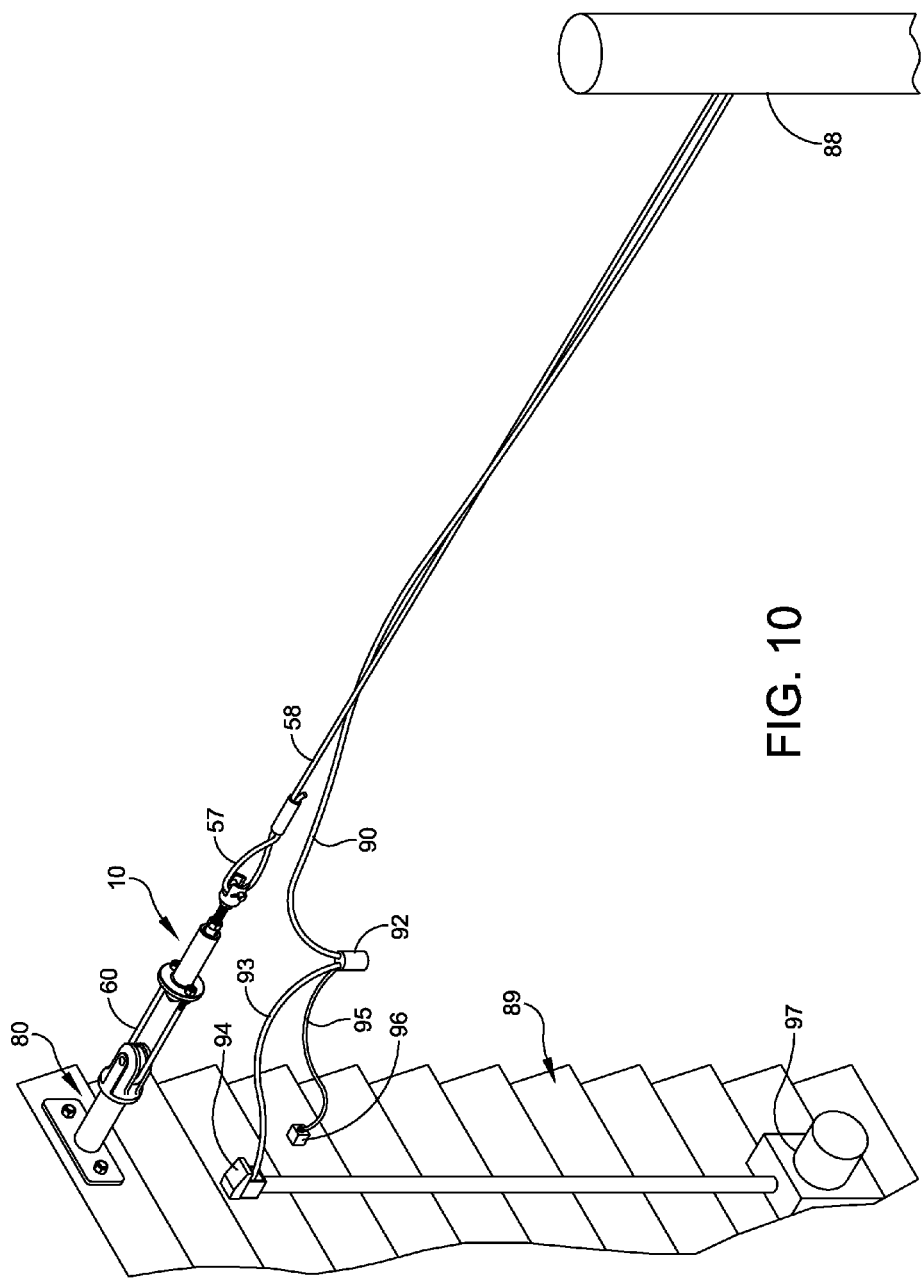
FIG. 10 is a perspective view similar to that shown in FIG. 9 illustrating the source as a utility pole.

With further reference to, for example, FIG. 9, it is noted that the electrical cabling at 90 may be considered as connecting to a junction box 92 where additional cables or conductors 93 and 95 connect to respective terminals 94 and 96. Refer also to FIG. 10 showing the terminal 94 connecting to an electrical meter arrangement 97. Thus, as far as the cabling is concerned, that itself may be considered as conventional and may be comprised of one or more conductor wires.

With further reference to FIGS. 1-8, the guide wire assembly 10 is for support of a guide wire such as the guide wire 58 illustrated in FIG. 9. This guide wire extends from an electrical source point to a use location. The guide wire assembly is comprised of a housing 12 having a base end illustrated at 14 and an extended end 16. The base 14 preferably has a larger diameter than the extended end 16. The entire housing may be constructed of a rigid metal material including aluminum. The housing 12 also has a longitudinal passage 18 extending between the base 14 and extending along the full length of the extended end 16.

The guide wire assembly also includes a metal insert 20 that is constructed and arranged for positioning within the longitudinal passage 18. The insert 20, such as illustrated in the exploded view of FIG. 8, has an elongated portion 24 and an enlarged head 26. Between the portion 24 and the head 26 there is defined a step 27. Refer also to FIGS. 6 and 7 that show the insert at 20, its bore 22, and the step at 27.

The guide wire assembly 10 is also comprised of an elongated threaded rod 30 having proximal and distal rod ends. The distal end of the threaded rod mates with the center bore 22 of the insert. For this mating, there is a section 31 of the bore 22 that is internally threaded. In FIGS. 6 and 7, the threaded rod 30 is shown threaded into the insert 20 extending a predetermined distance. FIG. 6 shows the assembly in its rest position while FIG. 7 shows the insert being forced to the left as indicated by arrows A as demonstrating an elongation of the assembly 10 under certain stress conditions. With respect to the recitation of "proximal end" and "distal end" ends, the distal end is considered as being toward the use location while the proximal end is considered as toward the source location.

Figure 5:
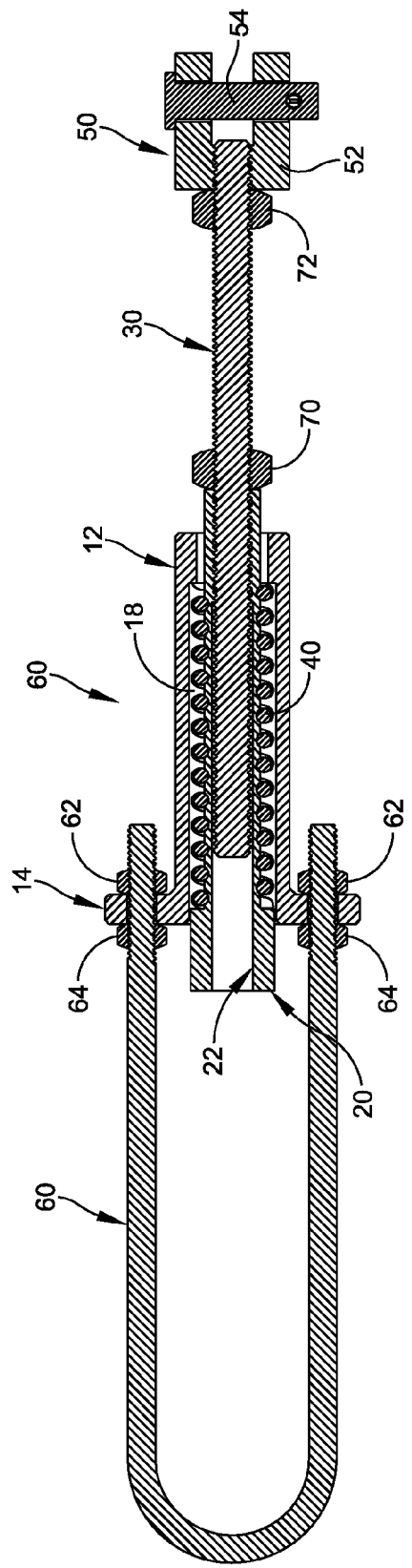
FIG. 5 is a cross-sectional view taken along line 5-5 of FIG. 4.

The guide wire assembly 10 is also comprised of a coil spring 40. Refer to FIGS. 5-7 illustrating the placement of the spring 40. In order to retain the spring in place, one end of the spring is urged against the step 27 while the other end of the spring is urged toward a step 17 of the housing 12. A proximal end of the housing 12 has an enlarged section 19 that forms the step 17. FIGS. 6 and 7 show both the step 17 and the step 27.

The guide wire assembly 10 also is comprised of a first attachment mechanism supported at the proximal end of the threaded rod 30. The first attachment mechanism is for support of the guide wire 58 at the guide wire loop 57. The first attachment mechanism is comprised of a clevis arrangement 50 that includes a clevis housing 52, a support pin 54 and a cotter pin 56. The loop 57 is retained about the pin 54.

The guide wire assembly 10 also includes a second attachment mechanism supported at the base 14 of the housing 12. This second attachment mechanism is in the form of a U-bolt 60 that has opposed ends that engage with the base 14. Refer to FIG. 4 showing the base 14 and the U-bolt 60. Opposed pairs of nuts 62 and 64 may be used for securing the U-bolt 60 to the base 14. It is noted that the threads of the U-bolt are sufficiently long so there can be some level of adjustment of the U-bolt relative to the base 14 so that it can be extended to different positions relative to the base 14.

Figure 8:
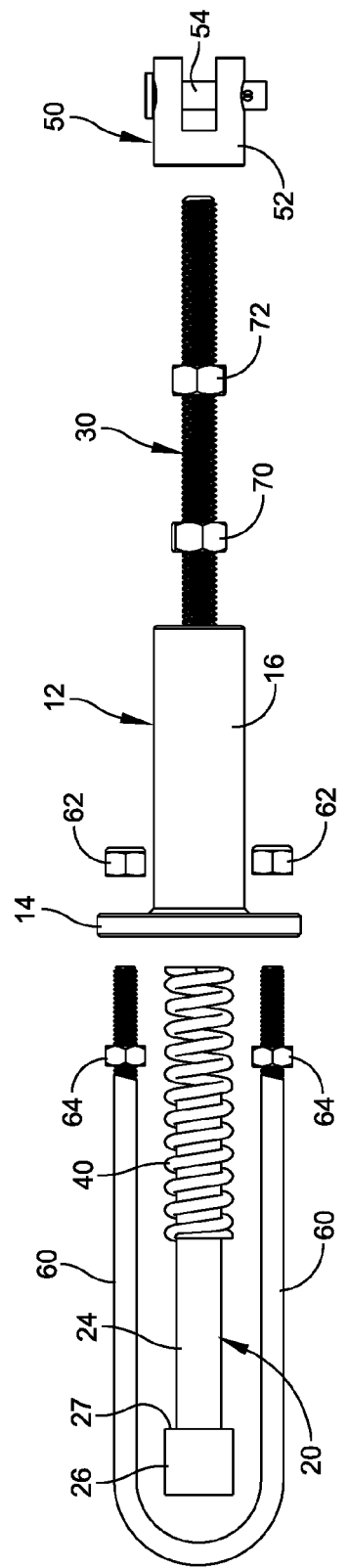
FIG. 8 is an exploded view showing the components of the guide wire assembly of FIG. 1.

With further reference to, for example, FIG. 8, it is noted that there can be provided two separate nuts identified as nuts 70 and 72. Refer also to FIGS. 6 and 7. The nut 70 is threadedly engaged with the rod 30 and can abut against a proximal end of the insert 20. The nut 72 may be used to secure a fixed position between the threaded rod and the clevis 50.

Figure 11:
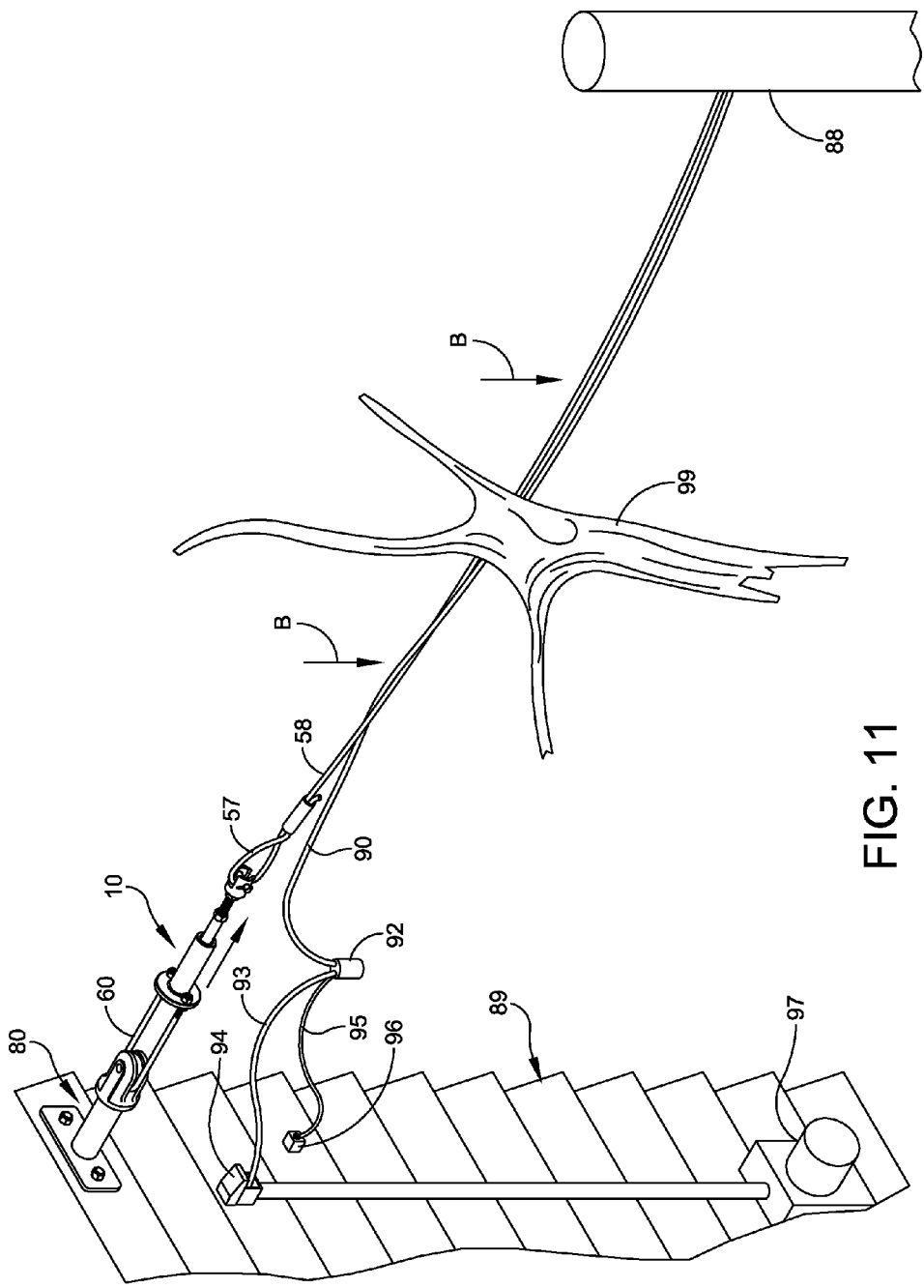
FIG. 11 is a perspective view similar to that shown in FIG. 10 illustrating a fault condition.

With respect to FIGS. 9 and 10, the guide wire assembly of the present invention may be considered as disposed at a rest position. FIG. 11 is meant to indicate one fault condition wherein a branch 99 is placed against the combination of the guide wire and cable. The movement of the guide wire and cable is indicated by the arrows B in FIG. 11. This may cause a pulling at the guide wire assembly 10 in the direction indicated by arrow C in FIG. 11. The guide wire assembly 10 is constructed so that there is a certain amount of resiliency allowing the guide wire assembly to extend at least partially to compensate for this fault condition. In that way, the guide wire is not broken free and thus a damaging condition is avoided.

Figure 12:
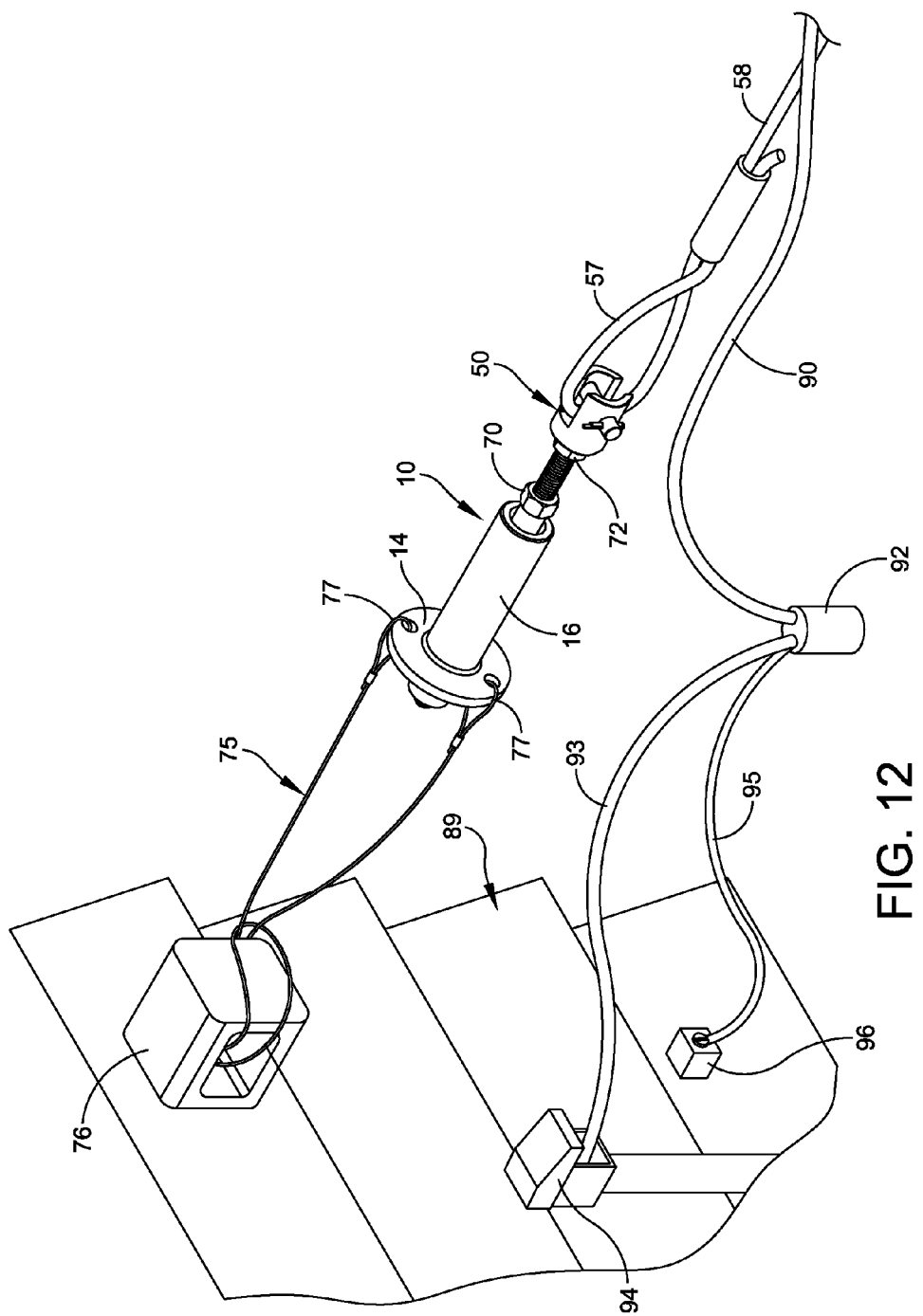
FIG. 12 is a perspective view of an alternate embodiment, particularly with regard to the use location.

Reference is now made to FIG. 12 that shows basically the same guide wire assembly 10. However, the clamping mechanism is now illustrated by a clamp block 76 and cables 75. Each of the cables 75 has an end loop 77 that engages with opposed holes in the base 14. The cable 75 then loops through a center opening in the clamp block 76.

Figure 13:
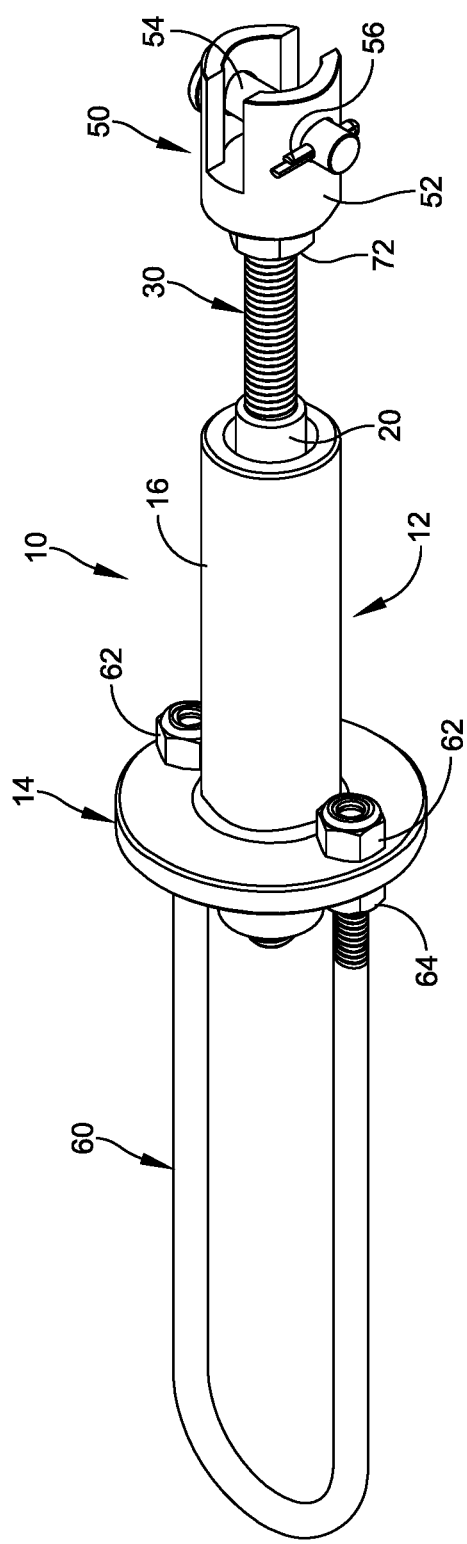
FIG. 13 is a perspective view similar to that shown in FIG. 1 with the absence of one of the locking nuts.
Figure 14:
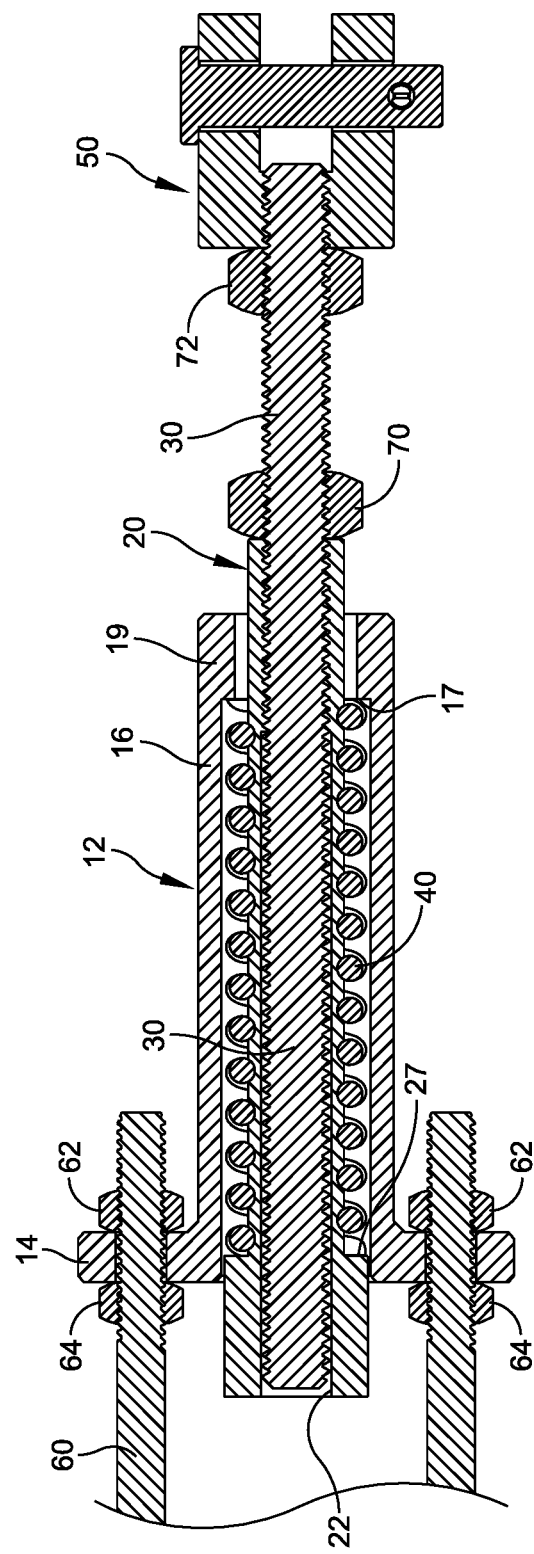
FIG. 14 is a cross sectional view similar to that shown in FIG. 5 but illustrating a different lengthwise adjustment.

Reference is also now made to FIG. 13 which shows a slightly different embodiment. It is noted that, in FIG. 13, only one nut 72 is employed without the placement of the second nut 70. Because the nut 72 firmly fixes the threaded rod 30 to the clevis 50, an additional nut 70 may not be necessary. Even so, the nut 70 also functions as a stop against the end of the insert to hold the parts together in a non-stressed condition.

FIG. 5 is an illustration of one particular adjustment position between the insert 20 and the housing 12. This can be adjusted to provide different lengths of the assembly. This can occur by threading the rod 30 to different positions and then locking the rod 30 in place such as by means of the nut 70. Refer now also to the cross-sectional view of FIG. 14 which shows the threaded rod in a shortened position. These adjustments are helpful in providing a wide degree of adjustment depending upon the individual circumstances.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A guide wire assembly to support electrical cabling that extends from an electrical source point at a utility pole to a use location at a building structure by means of a guide wire to support the electrical cabling and attached at one end thereof at the utility pole with an opposite end thereof extending toward the building structure, an improvement comprising the guide wire assembly that connects the opposite end of the guide wire to a second attachment mechanism, said guide wire assembly further comprising:

a housing having a base end, an extended end and a longitudinal passage extending between the base end and extended end;

an insert constructed and arranged to position within the longitudinal passage and having a center bore of the insert;

a threaded rod having proximal and distal rod ends, the distal end of the threaded rod mating with the center bore of the insert;

a coil spring disposed within the longitudinal passage of the housing and about the insert; and a first attachment mechanism supported at the proximal end of the threaded rod and to support the opposite end of the guide wire;

the second attachment mechanism supported at the base end of the housing at a clamp member.

2. The guide wire assembly of claim 1 wherein the extended end of the housing has the longitudinal passage formed with a step for receiving one end of the coil spring and wherein the insert has a distal head that forms a step for receiving an opposite end of the coil spring.

3. The guide wire assembly of claim 1 wherein the threaded rod extends with a threaded section thereof toward the first attachment mechanism and extends outside of the insert.

4. The guide wire assembly of claim 3 wherein the center bore of the insert is threaded only at a proximal end thereof and the threaded rod also extends with a threaded section thereof toward the first attachment mechanism and outside of the housing.

5. The guide wire assembly of claim 4 including a threaded securing nut that is disposed outside of both the housing and insert, the threaded securing nut being attached with the threaded section of the threaded rod.

6. The guide wire assembly of claim 5 including a second securing nut threaded with the threaded section of the threaded rod.

7. The guide wire assembly of claim 1 wherein the first attachment mechanism comprises a clevis body and associated clevis pin for retaining the opposite end of the guide wire.

8. The guide wire assembly of claim 7 wherein the second attachment mechanism comprises a U-bolt that engages the clamp member.

9. The guide wire assembly of claim 1 wherein the second attachment mechanism comprises a cable having end loops and that engages with the clamp member.

10. The guide wire assembly of claim 1 wherein the second attachment mechanism comprises a U-bolt that engages the clamp member.

11. In combination, electrical cabling that extends from an electrical source point at a utility pole to a use location at a building structure, a clamp member that is secured to the building structure, a guide wire to support the electrical cabling and attached at one end thereof at the utility pole with an opposite end thereof extending toward the building structure, and a guide wire assembly that connects the opposite end of the guide wire to the clamp member, said guide wire assembly comprising, a housing having a base end, an extended end and a longitudinal passage extending between the base end and extended end, an insert constructed and arranged to position within the longitudinal passage and having a center bore, a threaded rod having proximal and distal rod ends, the distal end of the threaded rod mating with the center bore of the insert, a coil spring disposed within the longitudinal passage of the housing and about the insert, and a second attachment mechanism supported at the base end of the housing and to support the housing at the clamp member.

12. The combination of claim 11 wherein the extended end of the housing has the longitudinal passage formed with a step for receiving one end of the coil spring and wherein the insert has a distal head that forms a step for receiving an opposite end of the coil spring.

13. The combination of claim 11 wherein the threaded rod extends with a threaded section thereof toward the first attachment mechanism and extends outside of the insert.

14. The combination of claim 13 wherein the center bore of the insert is threaded only at a proximal end thereof and the threaded rod also extends with a threaded section thereof toward the first attachment mechanism and outside of the housing.

15. The combination of claim 14 including a threaded securing nut disposed outside of the housing and insert, the threaded securing nut being attached with the threaded rod and useable to selectively adjust the tension on the coil spring.

16. The combination of claim 15 including a second securing nut threaded with the threaded section of the threaded rod and useable to selectively adjust the tension on the coil spring.

17. The combination of claim 11 wherein the first attachment mechanism comprises a clevis body and associated clevis pin for retaining the opposite end of the guide wire.

18. The combination of claim 11 wherein the second attachment mechanism comprises a U-bolt that engages the clamp member.

19. The combination of claim 11 wherein the second attachment mechanism comprises a cable having end loops and that engages with the clamp member.

\* \* \* \* \*